(12) United States Patent
Rathod et al.

(10) Patent No.: US 8,115,869 B2
(45) Date of Patent: Feb. 14, 2012

(54) METHOD AND SYSTEM FOR EXTRACTING RELEVANT INFORMATION FROM CONTENT METADATA

(75) Inventors: Priyang Rathod, Mountain Vier, CA (US); Phuong Nguyen, San Jose, CA (US); Anugeetha Kunjithapatham, Sunnyvale, CA (US); Mithun Sheshagiri, San Francisco, CA (US); Alan Messer, Los Gatos, CA (US)

(73) Assignee: Samsung Electronics Co., Ltd., Suwon (KR)

( * ) Notice: Subject to any disclaimer, the term of this patent is extended or adjusted under 35 U.S.C. 154(b) by 1267 days.

(21) Appl. No.: 11/821,938

(22) Filed: Jun. 26, 2007

(65) Prior Publication Data

US 2008/0204595 A1    Aug. 28, 2008

Related U.S. Application Data

(63) Continuation-in-part of application No. 11/789,609, filed on Apr. 25, 2007.

(60) Provisional application No. 60/903,962, filed on Feb. 28, 2007.

(51) Int. Cl.
*H04N 5/445*    (2011.01)
*H04N 7/087*    (2006.01)

(52) U.S. Cl. ........ 348/465; 348/468; 348/461; 348/473; 725/137

(58) Field of Classification Search .................. 348/465, 348/468, 461, 460, 473, 552; 707/999.003, 707/E17.014; 725/136, 141, 137
See application file for complete search history.

(56) References Cited

U.S. PATENT DOCUMENTS

| | | | |
|---|---|---|---|
| 5,790,935 | A | 8/1998 | Payton |
| 5,974,406 | A | 10/1999 | Bisdikian et al. |
| 5,983,214 | A | 11/1999 | Lang et al. |
| 5,983,237 | A | 11/1999 | Jain et al. |
| 5,995,959 | A | 11/1999 | Friedman et al. |
| 6,151,603 | A | 11/2000 | Wolfe |
| 6,253,238 | B1 | 6/2001 | Lauder et al. |
| 6,334,127 | B1 | 12/2001 | Bieganski et al. |
| 6,412,073 | B1 | 6/2002 | Rangan |
| 6,438,579 | B1 | 8/2002 | Hosken |
| 6,480,844 | B1 | 11/2002 | Cortes et al. |

(Continued)

FOREIGN PATENT DOCUMENTS

CN    1393107 A    1/2003

(Continued)

OTHER PUBLICATIONS

Chinese Office Action dated Mar. 25, 2010 issued in Chinese Patent Application No. 200810082621.3, 7 pp., China (English-language translation included—5 pp.).

(Continued)

*Primary Examiner* — Jeffrey Harold
*Assistant Examiner* — Jean W Desir
(74) *Attorney, Agent, or Firm* — Beyer Law Group LLP

(57) ABSTRACT

A method and system for extracting relevant information from content metadata is provided. User access to content is monitored. A set of extraction rules for information extraction is selected. Key information is extracted from metadata for the content based on the selected extraction rules. Additionally, a type for the content can be determined, and a set of extraction rules is selected based on the content type. The key information is used in queries for searching information of potential interest to the user, related to the content accessed.

35 Claims, 11 Drawing Sheets

U.S. PATENT DOCUMENTS

| | | |
|---|---|---|
| 6,637,028 B1 | 10/2003 | Voyticky et al. |
| 6,721,748 B1 | 4/2004 | Knight et al. |
| 6,766,523 B2 | 7/2004 | Herley |
| 6,774,926 B1 | 8/2004 | Ellis et al. |
| 6,807,675 B1 | 10/2004 | Maillard |
| 6,826,512 B2 | 11/2004 | Dara-Abrams et al. |
| 6,842,877 B2 | 1/2005 | Robarts et al. |
| 6,954,755 B2 | 10/2005 | Reisman |
| 6,981,040 B1 | 12/2005 | Konig et al. |
| 7,028,024 B1 | 4/2006 | Kommers et al. |
| 7,054,875 B2 | 5/2006 | Keith, Jr. |
| 7,062,561 B1 | 6/2006 | Reisman |
| 7,069,575 B1 | 6/2006 | Goode et al. |
| 7,110,998 B1 | 9/2006 | Bhandari et al. |
| 7,158,961 B1 | 1/2007 | Charikar |
| 7,158,986 B1 | 1/2007 | Oliver et al. |
| 7,162,473 B2 | 1/2007 | Dumais et al. |
| 7,165,080 B2 | 1/2007 | Kotcheff et al. |
| 7,181,438 B1 | 2/2007 | Szabo |
| 7,194,460 B2 | 3/2007 | Komamura |
| 7,203,940 B2 | 4/2007 | Barmettler et al. |
| 7,225,187 B2 | 5/2007 | Dumais et al. |
| 7,284,202 B1 | 10/2007 | Zenith |
| 7,343,365 B2 | 3/2008 | Farnham et al. |
| 7,363,294 B2 | 4/2008 | Billsus et al. |
| 7,386,542 B2 | 6/2008 | Maybury et al. |
| 7,389,224 B1 | 6/2008 | Elworthy |
| 7,389,307 B2 | 6/2008 | Golding |
| 7,433,935 B1 | 10/2008 | Obert |
| 7,552,114 B2 | 6/2009 | Zhang et al. |
| 7,565,345 B2 | 7/2009 | Bailey et al. |
| 7,593,921 B2 | 9/2009 | Goronzy et al. |
| 7,603,349 B1 | 10/2009 | Kraft et al. |
| 7,617,176 B2 | 11/2009 | Zeng et al. |
| 7,634,461 B2 | 12/2009 | Oral et al. |
| 7,657,518 B2 | 2/2010 | Budzik et al. |
| 7,685,192 B1 | 3/2010 | Scofield et al. |
| 7,716,158 B2 | 5/2010 | McConnell |
| 7,716,199 B2 | 5/2010 | Guha |
| 7,793,326 B2 | 9/2010 | McCoskey |
| 2001/0003214 A1 | 6/2001 | Shastri et al. |
| 2001/0023433 A1 | 9/2001 | Natsubori et al. |
| 2002/0022491 A1 | 2/2002 | McCann et al. |
| 2002/0026436 A1 | 2/2002 | Joory |
| 2002/0087535 A1 | 7/2002 | Kotcheff et al. |
| 2002/0161767 A1 | 10/2002 | Shapiro et al. |
| 2002/0162121 A1 | 10/2002 | Mitchell |
| 2003/0028889 A1 | 2/2003 | McCoskey |
| 2003/0033273 A1 | 2/2003 | Wyse |
| 2003/0105682 A1 | 6/2003 | Dicker et al. |
| 2003/0131013 A1 | 7/2003 | Pope et al. |
| 2003/0158855 A1 | 8/2003 | Farnham et al. |
| 2003/0172075 A1 | 9/2003 | Reisman |
| 2003/0184582 A1 | 10/2003 | Cohen |
| 2003/0221198 A1* | 11/2003 | Sloo ............... 725/136 |
| 2003/0229900 A1 | 12/2003 | Reisman |
| 2003/0231868 A1 | 12/2003 | Herley |
| 2004/0031058 A1 | 2/2004 | Reisman |
| 2004/0073944 A1 | 4/2004 | Booth |
| 2004/0194141 A1 | 9/2004 | Sanders |
| 2004/0244038 A1 | 12/2004 | Utsuki et al. |
| 2004/0249790 A1 | 12/2004 | Komamura |
| 2005/0004910 A1 | 1/2005 | Trepess |
| 2005/0137996 A1 | 6/2005 | Billsus et al. |
| 2005/0154711 A1 | 7/2005 | McConnell |
| 2005/0160460 A1 | 7/2005 | Fujiwara et al. |
| 2005/0177555 A1 | 8/2005 | Alpert et al. |
| 2005/0240580 A1 | 10/2005 | Zamir et al. |
| 2005/0246726 A1 | 11/2005 | Labrou et al. |
| 2005/0289599 A1 | 12/2005 | Matsuura et al. |
| 2006/0026152 A1 | 2/2006 | Zeng et al. |
| 2006/0028682 A1 | 2/2006 | Haines |
| 2006/0036593 A1 | 2/2006 | Dean et al. |
| 2006/0066573 A1 | 3/2006 | Matsumoto |
| 2006/0074883 A1 | 4/2006 | Teevan et al. |
| 2006/0084430 A1 | 4/2006 | Ng |
| 2006/0095415 A1 | 5/2006 | Sattler et al. |
| 2006/0133391 A1 | 6/2006 | Kang et al. |
| 2006/0136670 A1 | 6/2006 | Brown et al. |
| 2006/0156326 A1 | 7/2006 | Goronzy et al. |
| 2006/0161542 A1 | 7/2006 | Cucerzan et al. |
| 2006/0195362 A1 | 8/2006 | Jacobi et al. |
| 2006/0242283 A1 | 10/2006 | Shaik et al. |
| 2007/0043703 A1 | 2/2007 | Bhattacharya et al. |
| 2007/0061222 A1 | 3/2007 | Allocca et al. |
| 2007/0061352 A1 | 3/2007 | Dimitrova et al. |
| 2007/0073894 A1 | 3/2007 | Erickson et al. |
| 2007/0078822 A1 | 4/2007 | Cuzerzan et al. |
| 2007/0107019 A1 | 5/2007 | Romano et al. |
| 2007/0130585 A1 | 6/2007 | Perret et al. |
| 2007/0143266 A1 | 6/2007 | Tang et al. |
| 2007/0156447 A1 | 7/2007 | Kim et al. |
| 2007/0179776 A1 | 8/2007 | Segond et al. |
| 2007/0198485 A1 | 8/2007 | Ramer et al. |
| 2007/0198500 A1 | 8/2007 | Lucovsky et al. |
| 2007/0214123 A1 | 9/2007 | Messer et al. |
| 2007/0214488 A1 | 9/2007 | Nguyen et al. |
| 2007/0220037 A1 | 9/2007 | Srivastava et al. |
| 2007/0233287 A1 | 10/2007 | Sheshagiri et al. |
| 2007/0300078 A1 | 12/2007 | Ochi et al. |
| 2008/0040316 A1 | 2/2008 | Lawrence |
| 2008/0082744 A1 | 4/2008 | Nakagawa |
| 2008/0114751 A1 | 5/2008 | Cramer et al. |
| 2008/0133501 A1 | 6/2008 | Andersen et al. |
| 2008/0133504 A1 | 6/2008 | Messer et al. |
| 2008/0162651 A1 | 7/2008 | Madnani |
| 2008/0162731 A1 | 7/2008 | Kauppinen et al. |
| 2008/0183596 A1 | 7/2008 | Nash et al. |
| 2008/0183681 A1 | 7/2008 | Messer et al. |
| 2008/0183698 A1 | 7/2008 | Messer et al. |
| 2008/0204595 A1 | 8/2008 | Rathod et al. |
| 2008/0208839 A1 | 8/2008 | Sheshagiri et al. |
| 2008/0235209 A1 | 9/2008 | Rathod et al. |
| 2008/0235393 A1 | 9/2008 | Kunjithapatham et al. |
| 2008/0242279 A1 | 10/2008 | Ramer et al. |
| 2008/0250010 A1 | 10/2008 | Rathod et al. |
| 2008/0266449 A1 | 10/2008 | Rathod et al. |
| 2008/0288641 A1 | 11/2008 | Messer et al. |
| 2009/0029687 A1 | 1/2009 | Ramer et al. |
| 2009/0055393 A1 | 2/2009 | Messer et al. |
| 2009/0077065 A1 | 3/2009 | Song et al. |
| 2009/0112848 A1 | 4/2009 | Kunjithapatham et al. |
| 2010/0070895 A1 | 3/2010 | Messer |
| 2010/0191619 A1 | 7/2010 | Dicker et al. |

FOREIGN PATENT DOCUMENTS

| | | | |
|---|---|---|---|
| CN | 1723458 A | | 1/2006 |
| CN | 1808430 A | | 7/2006 |
| JP | 2003-099442 A | | 4/2003 |
| KR | 10-2002-0005147 A | | 1/2002 |
| KR | 10-2002-0006810 A | | 1/2002 |
| KR | 10-2004-0052339 A | | 6/2004 |
| KR | 10-2006-0027226 A | | 3/2006 |
| WO | WO 01/37465 A2 | | 5/2001 |
| WO | WO 02/43310 A2 | | 5/2002 |
| WO | WO 2005/055196 A2 | | 6/2005 |
| WO | WO 2007/004110 A2 | | 1/2007 |

OTHER PUBLICATIONS

Notification of Transmittal of the International Search Report and the Written Opinion of the International Search Authority Application No. PCT/KR2008/000537 dated May 15, 2008, 16 pages.

U.S. Non-final Office Action for U.S. Appl. No. 11/732,887 mailed Jun. 5, 2009.

Chinese Office Action dated Jul. 12, 2010 issued in Chinese Patent Application No. 200810082621.3, 8 p., China (English-language translation included—16 p.).

Notification of Transmittal of the International Search Report and the Written Opinion of the International Searching Authority, dated Aug. 20, 2008; International Search Report and Written Opinion of the International Searching Authority for International Application No. PCT/KR2008/001941, 10 pages.

Chinese Office Action dated Aug. 14, 2009 issued in Chinese Patent Application No. 2008100826213 (English-language translation included).

Notification of Transmittal of the International Search Report and the Written Opinion of the International Searching Authority for International Application No. PCT/KR2008/001558, dated Jun. 26, 2008, 10 pages.

Apple Inc., Apple iTunes, http://www.apple.com/itunes/, Apr. 28, 2003.

Babaguchi, N. et al., "Intermodal Collaboration: A Strategy for Semantic Content Analysis for Broadcasted Sports Video," IEEE International Conference on Image Processing, Sep. 2003, pp. 13-16, vol. 1, Barcelona, Spain.

Brill, E., "A Simple Rule-Based Part of Speech Tagger," Third Conference on Applied Natural Language Processing, Mar. 1992, pp. 152-155, Trento, Italy.

Google Inc., Google Search Engine, http://www.google.com, Aug. 1998.

Google Inc., Google Desktop Search, http://desktop.google.com, Oct. 15, 2004.

Henzinger, M. et al, "Query-free news search," May 2003, Proceedings on the 12th International Conference on World Wide Web, Budapest, Hungary.

Livingston, K. et al., "Beyond broadcast: a demo," Jan. 2003, In Proceedings of the 8th international Conference on intelligent User interfaces, ACM Press, New York, NY, 325-325.

Microsoft Corporation, Microsoft Windows Media Player, http://www.microsoft.com/windows/windowsmedia/, Feb. 1999.

Microsoft Corporation, MSN TV, http://www.webtv.com/pc, Feb. 2006.

Opera Software ASA, Opera Browser for Devices, http://www.opera.com/products/devices/, Mar. 2006.

Rau Lisa, F. et al, "Domain-independent summarization of news," Jun. 1994, In Summarizing Text for Intelligent Communication, pp. 71-75, Dagstuhl, Germany.

Spalti, M., "Finding and Managing Web Content with Copernic 2000," Sep. 2000, Library Computing, Westport, pp. 217-221, vol. 18, No. 3.

Tjondronegoro, D. et al., "Extensible detection and indexing of highlight events in broadcasted sports video," Jan. 2006, Proceedings of the 29th Australasian Computer Science Conference, Hobart, Australia.

Wachman, J. et al., "Tools for Browsing a TV Situation Comedy Based on Content Specific Attributes," Mar. 2001, Multimedia Tools and Applications, v.13 n. 3, p. 255-284.

Yahoo Search Engine, http://search.yahoo.com, Dec. 1998.

Zhuang, Y. et al, "Applying semantic association to support content-based video retrieval," Oct. 1998, International workshop on Very Low Bitrate Video Coding (VLBV'98).

Livingston, K. et al., "Beyond Broadcast," 8th International Conference on Intelligent User Interfaces, Jan. 2003, pp. 260-262, Association for Computing Machinery, New York, NY.

Tivo Inc, http://www.tivo.com, downloaded Sep. 19, 2008, 1 page.

"Computing MEng Individual Project, ANSES—Automatic News Summarization and Extraction System," http://mmis.doc.ic.ac.uk/pr-1.wrong-2002/overview.html, downloaded Sep. 24, 2008, 4 pages.

Miyauchi, S. et al., "Highlight Detection and Indexing in Broadcast Sports Video by Collaborative Processing of Text, Audio, and Image," Systems and Computers in Japan, vol. 34, No. 12, 2003, pp. 22-31, Translated from Denshi Joho Tsushin Gakkai Ronbunshi, vol. J85-D-II, No. 11, Nov. 2002, pp. 1692-1700.

Nitta, Naoko et al., "Automatic Story Segmentation of Closed-Caption Text for Semantic Content Analysis of Broadcasted Sports Video," 8th International Workshop on Multimedia Information Systems, 2002, pp. 110-116.

Miura, K. et al., "Automatic Generation of a Multimedia Encyclopedia from TV Programs by Using Closed Captions and Detecting Principal Video Objects," Proceedings of the Eighth IEEE International Symposium on Multimedia (ISM'06), 2006, IEEE, 8 pages.

U.S. Non-final Office Action for U.S. Appl. No. 12/056,184 mailed on Jun. 11, 2010.

U.S. Final Office Action for U.S. Appl. No. 12/056,184 mailed on Nov. 23, 2010.

U.S. Non-Final Office Action for U.S. Appl. No. 11/726,340 mailed May 19, 2009.

Microsoft Corporation, Microsoft Windows Media Player 10, http://www.microsofl.com/windows/windowsmedialmpl0, Sep. 19, 2008, US.

Realnetworks, Inc., http://www.real.com, Sep. 19, 2008, US.

Copernic Inc., http://copernic.com/en/products/desktop-search/index.html, Sep. 18, 2008.

Copernic Inc., Copernic Search Engine for your PC, http://www.copernic.com, Sep. 19, 2008, US.

Miyamori, H. et al., "Webified Video: Media Conversion from TV Programs to Web Content for Cross-Media Information Integration," Proceedings of the 16th International Conference on Database and Expert Systems Applications, 2005, pp. 176-185, Springer-Verlag, Berlin, Heidelberg.

Moraveji, N. et al., "DynaLine: A Non-Disruptive TV User Interface for Passive Browsing of Internet Video," Microsofl Research Technical Report, 2006, pp. 1-4.

U.S. Final Office Action for U.S. Appl. No. 11/969,778 mailed on Sep. 2, 2010.

U.S. Non-final Office Action for U.S. Appl. No. 11/969,778 mailed on Apr. 19, 2010.

U.S. Non-final Office Action for U.S. Appl. No. 11/803,826 mailed on Jul. 24, 2009.

Vechtomova, O. et al., "Query expansion with terms selected using lexical cohesion analysis of documents", Information Processing and Management: an International Journal, Oct. 2006, pp. 849-865, vol. 43, No. 4, Pergamon Press Inc., Tarrytown, New York, United States.

U.S. Final Office Action for U.S. Appl. No. 11/633,880 mailed Oct. 28, 2010.

U.S. Non-final Office Action for U.S. Appl. No. 11/725,865 mailed Oct. 16, 2009.

U.S. Final Office Action for U.S. Appl. No. 11/713,350 mailed Sep. 9, 2010.

U.S. Non-final Office Action for U.S. Appl. No. 11/633,880 mailed May 11, 2010.

AOL LLC, http://www.aol.com, downloaded Sep. 19, 2008, pp. 1-2, United States.

Ask Search Engine, http://www.ask.com, downloaded Sep. 19, 2008, pp. 1, United States.

U.S. Advisory Action for U.S. Appl. No. 11/633,880 mailed Nov. 25, 2009.

U.S. Non-final Office Action for U.S. Appl. No. 11/900,847 mailed Oct. 28, 2009.

"Placement in the DMOZ.org directory—Pure Power", DMOZ / Google Directory, posted on Apr. 30, 2005, p. 1, http://www.ahfx.net/weblog/13.

U.S. Office Action for U.S. Appl. No. 11/633,880 mailed Jan. 6, 2009.

U.S. Office Action for U.S. Appl. No. 11/633,880 mailed Aug. 10, 2009.

U.S. Final Office Action for U.S. Appl. No. 11/713,350 mailed Mar. 2, 2009.

U.S. Final Office Action for U.S. Appl. No. 11/713,350 mailed Aug. 14, 2009.

Office Action dated Sep. 8, 2011 from U.S. Appl. No. 12/544,994.

U.S. Final Office Action for U.S. Appl. No. 11/725,865 mailed Mar. 16, 2010.

U.S. Non-final Office Action for U.S. Appl. No. 11/713,350 mailed Mar. 8, 2010.

U.S. Non-final Office Action for U.S. Appl. No. 11/803,826 mailed on Mar. 3, 2010.

U.S. Office Action for U.S. Appl. No. 11/726,340 mailed Oct. 14, 2010.

U.S. Office Action for U.S. Appl. No. 11/726,340 mailed Feb. 14, 2011.

U.S. Office Action for U.S. Appl. No. 11/726,340 mailed Dec. 9, 2009.

U.S. Office Action for U.S. Appl. No. 12/263,089 mailed Mar. 25, 2011.

U.S. Office Action for U.S. Appl. No. 11/732,887 mailed on Dec. 4, 2009.

U.S. Office Action for U.S. Appl. No. 11/725,865 mailed Mar. 4, 2011.

U.S. Office Action for U.S. Appl. No. 11/633,880 mailed Mar. 17, 2011.
U.S. Office Action for U.S. Appl. No. 11/803,826 mailed Jun. 1, 2011.
U.S. Office Action for U.S. Appl. No. 11/969,778 mailed Jun. 15, 2011.
Office Action dated Jun. 27, 2011 from U.S. Appl. No. 11/725,865.
Office Action dated Jul. 6, 2011 from U.S. Appl. No. 11/789,609.
Office Action dated Oct. 6, 2010 from U.S. Appl. No. 11/981,019.
Office Action dated Dec. 29, 2009 from U.S. Appl. No. 11/981,019.
Final Office Action dated Mar. 16, 2011 from U.S. Appl. No. 11/981,019.
Final Office Action dated Jun. 17, 2010 from U.S. Appl. No. 11/981,019.
Office Action dated Aug. 2, 2011 from U.S. Appl. No. 11/713,312.
Google Inc., webhp, http://www.google.com/webhp?complete-1&hl-en, downloaded Sep. 25, 2008, p. 1.
Office Action dated Aug. 22, 2011 from U.S. Appl. No. 11/981,019.
Final Office Action dated Sep. 1, 2011 from U.S. Appl. No. 12/263,089.

* cited by examiner

METHOD AND SYSTEM FOR EXTRACTING RELEVANT INFORMATION FROM CONTENT METADATA

RELATED APPLICATIONS

This application is a continuation-in-part of U.S. patent application Ser. No. 11/789,609, filed Apr. 25, 2007, incorporated herein by reference. This application further claims priority from U.S. Provisional Patent Application Ser. No. 60/903,962 filed Feb. 28, 2007, incorporated herein by reference.

FIELD OF THE INVENTION

The present invention relates to providing relevant information to users, and in particular to using metadata for content to provide relevant information to users.

BACKGROUND OF THE INVENTION

Television (TV) is one of the primary means of entertainment, and provides a widespread medium for entertainment in homes. With the rise in the amount of information available on the Internet and on other devices in home networks, there has been a need to bring relevant information from the Internet and other sources to a user's TV. The relevant information includes that which is related to content being accessed by the user on the TV. Such information is of potential interest to the user.

However, TV signals do not provide much metadata associated with content, to help in finding information related to such content. Though in many countries TV content providers are required to send closed captions embedded in the TV signals, there are numerous TV channels and each carries various kinds of content including programs such as sports games, soap operas, movies, sitcoms, news, documentaries, infomercials, reality TV, etc. Each has a different amount and type content in its closed captions that may be useful.

There are existing approaches in which a user can obtain information in a network of resources. In one approach, the user requests the information. In another approach, the user specifies information by providing keywords and then browses the information to find the piece of information that satisfies the user's needs. However, specifying keywords using devices without keyboards, such as consumer electronics (CE) devices, can be a tedious task.

Such conventional approaches do not analyze and obtain information of interest to the user, and without limiting specific sources of information. Further, such approaches do not adapt to the type of program being watched for obtaining relevant information. There is, therefore, a need for a method and a system for analyzing and obtaining information of interest to the user, without limiting specific sources of information. There is, also a need for a method and system of providing relevant information to users, which is adaptive to the type of content accessed.

BRIEF SUMMARY OF THE INVENTION

The present invention provides a method and system for extracting relevant information from content metadata. In one embodiment, this involves analyzing closed caption information and obtaining information of interest to a user, without limiting the specific sources of information. Such an approach is useful in providing access to information of potential interest to a user of an electronic device, by monitoring the user's interaction with the device to identify information accessed by the user, determining key information based on the identified information, wherein the identified information includes closed-caption information and searching available sources for information of potential interest to the user based on said key information. Searching available sources includes forming a query based on the key information and searching an external network such as the Internet using the query.

One implementation of such an electronic device is a CE device such as a TV that receives TV programming including closed caption information. The closed-caption information of a TV program being accessed/viewed by a user is analyzed and key information (keywords/phrases) is extracted. The key information is used to form queries and conduct searches using search engines such as available Internet search engines. The search results are presented to the user as recommendations, representing information of potential interest to the user. The user can select among the recommendations for further searching to find additional and/or more refined information of interest to the user.

The present invention further provides for extracting information from content metadata based on content type. In one implementation, this involves altering keyword extraction to adapt to different types of content accessed. Extracting keywords relevant to content such as TV programs, from metadata sources such as closed captions, is adapted based on the genre (category) of the content. Keyword extraction from closed captions text for TV programs is altered based on the EPG information for the TV programs. The EPG indicates the genre of the TV programs, wherein keyword extraction from closed captions is parameterized using the EPG genre information. Based on the EPG information, the genre of a TV program is used to determine the kind of keywords to extract from the closed captions of the TV program.

These and other features, aspects and advantages of the present invention will become understood with reference to the following description, appended claims and accompanying figures.

DETAILED DESCRIPTION OF THE INVENTION

Figure 1:
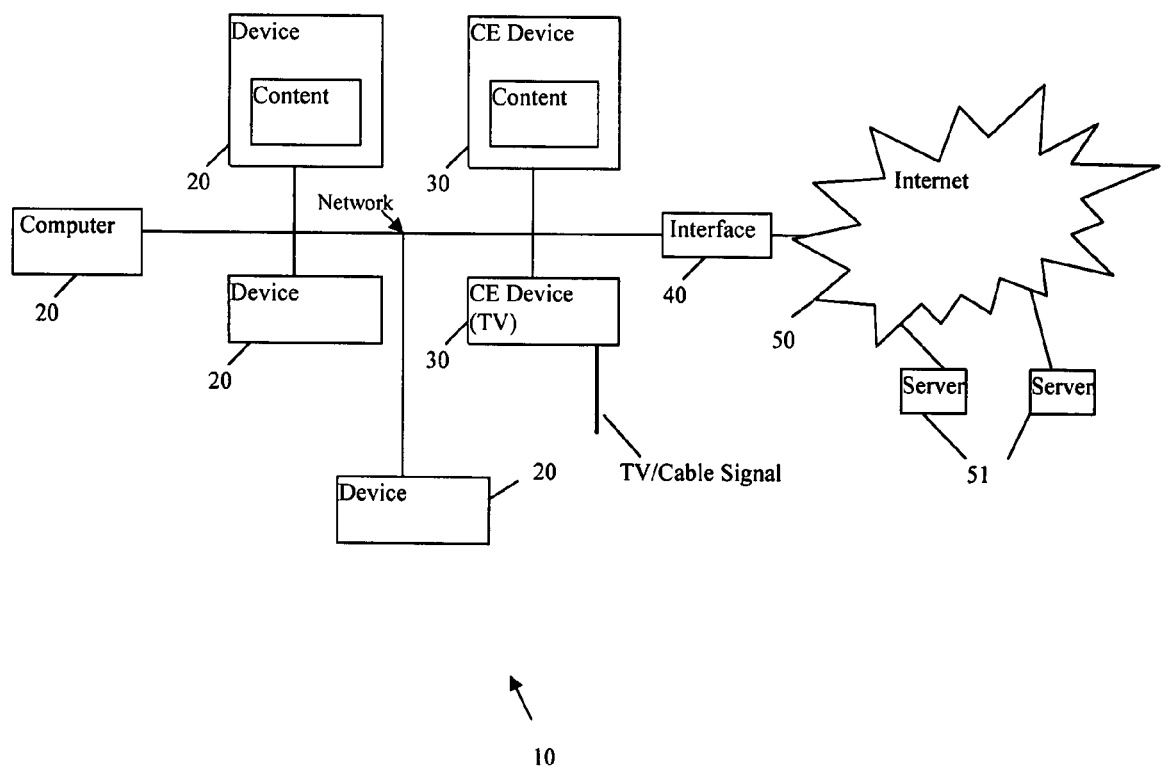
FIG. 1 shows an example of a network of electronic devices that implements an embodiment of the present invention.

The present invention provides a method and system for extracting information from content metadata. The present invention further allows altering information extraction from metadata sources to adapt to different types (genres or categories) of content. In one embodiment, the present invention provides method and a system for analyzing and obtaining information of interest to a user, without limiting specific sources of information. Potential information that the user may be interested in is determined by monitoring the user's interactions with a device in a local network of devices, connected to an external network. Such a device can be a CE device in a local area network (e.g., a home network) that is connected to the Internet.

In one implementation, this involves receiving closed captioned programming including closed caption information and analyzing the closed caption information for key information indicating user interests. The key information is then used to find related information from sources of information such as the Internet, which the user may potentially be interested in.

On a typical CE device such as a TV, in the absence of a keyboard, it is difficult for a user to search for information on the Internet by entering keywords. If a user is watching a TV program, that is a good indication that the user is interested in the content of the TV program. Therefore, the content of the TV program is analyzed by gathering and analyzing text received as closed caption information for the TV program. Further, contextual information is gathered from the information about the channel being watched. The closed caption information and the contextual information can be combined and used to make recommendations to the user about information the user may potentially be interested in.

The gathered information is used to determine one or more keywords of potential interest to the user. The keywords are then used to search for related information on the Internet. For example, if the user is watching a news coverage involving Baltimore, the word "Baltimore" is extracted as a keyword. That keyword is used to form a query to search the Internet by using a search engine to find information, such as websites that include information about Baltimore city or Baltimore Ravens, etc.

The search results are presented to the user as recommendations, comprising potential search queries which may be selected by the user and executed to find further information on the Internet that may be of interest to the user. For example, while the user is watching a documentary on Antarctica on a TV, the keyword "Antarctica" is selected as a keyword and a search on the Internet returns "polar bears" as a recommendation of potential interest to the user. The user can then choose that recommendation to find more information about polar bears. If so, a query for "polar bears" is sent to a search engine and the results are displayed for the user.

Searching is not limited to a predetermined or fixed number of categories or queries or information sources. In one example, keywords are identified based on the closed caption information for searching. The keywords may be suggested to the user, wherein upon user selection, additional information is obtained using search engines that search available sources on the Internet (different websites available to the search engines), rather than a predetermined and/or a fixed number of sources such as one or more particular websites.

FIG. 1 shows a functional architecture of an example network 10, such as a local network (e.g., a home network, local area network (LAN)), according to an embodiment of the present invention. The network 10 embodies a process for analyzing TV closed caption information to find related information on the Internet 50. The network 10 comprises electronic devices 20 such as appliances which may include content and CE devices 30 (e.g., TV, DVD player, cell phone, PDA) which may include content. The network 10 further includes an interface 40 that connects the network 10 to the external network 50 (e.g., another local network, the Internet). The external network 50 is connected to one or more servers 51. The devices 20 and 30 can implement the Universal Plug and Play (UPnP) protocol for communication therebetween. Those skilled in the art will recognize that the present invention is useful with other network communication protocols (e.g., Jini, HAVi, IEEE 1394). Further, the network 10 can be a wired network, a wireless network, or a combination thereof.

Figure 2:
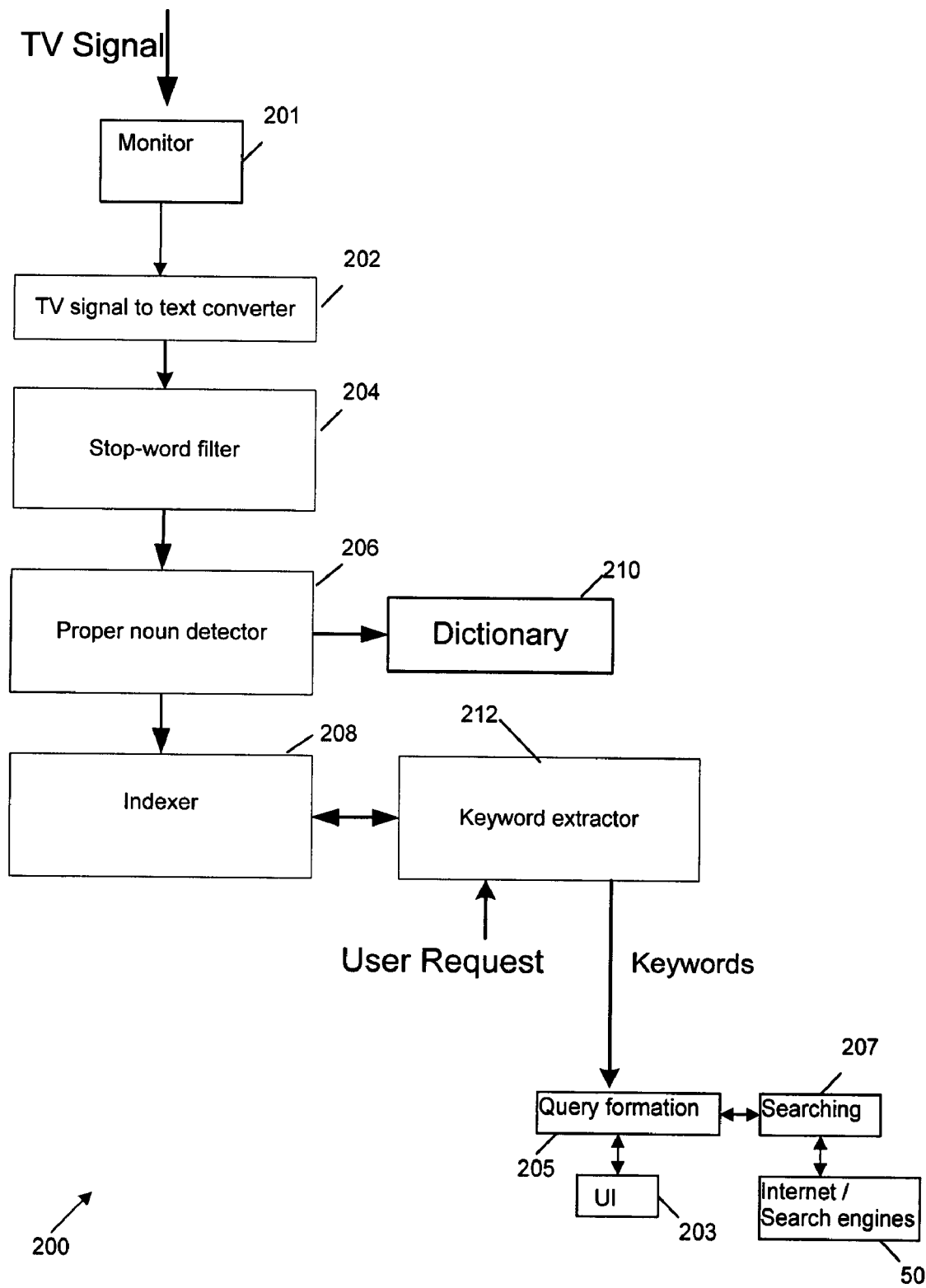
FIG. 2 shows a functional block diagram of an example system for analyzing TV closed caption information to find related information on the Internet, according to an embodiment of the present invention.

As described further below, in one example, a process for analyzing TV closed caption information and suggesting information of interest to the user, according to the present invention can be implemented in a device 30 in FIG. 1. A system that implements a process for analyzing TV closed caption information receives a TV signal as input. The channel being viewed by the user is monitored and corresponding closed caption information that is a part of the TV signal is analyzed. Then, a set of keywords are determined which capture the gist of what is being viewed by the user. FIG. 2 shows a functional block diagram of an example system 200 for analyzing TV closed caption information according to an embodiment of the present invention. The system 200 utilizes a channel monitor 201, a TV signal to text converter 202, a stop-word filter 204, a proper noun detector 206, an indexer 208, a dictionary 210 and a keyword extractor 212.

Figure 3A:
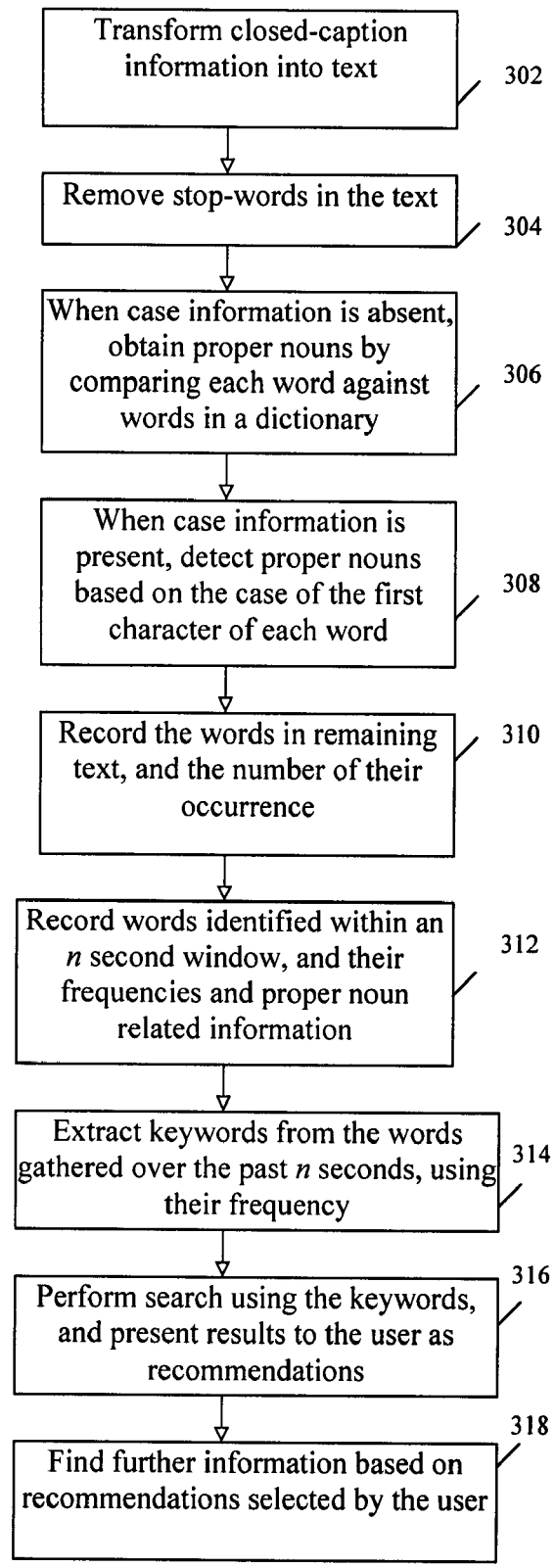
FIG. 3A shows a flowchart of example steps of a process for analyzing TV closed caption information to find related information on the Internet, according to an embodiment of the present invention.

The monitor 201 monitors the TV/cable signal and determines channel information that is accessed/viewed by the user. That information includes closed caption information which is analyzed to extract words that capture the context, by utilizing the example process 300 in FIG. 3A. The example process 300 includes the steps of:

Step 302: The closed caption information transformed into text by the converter 202 using known transformation methods.

Step 304: The stop-words in the text are removed by the stop-word filter 204. Stop-words include words such as "of", "on", "the" etc., which have no meaning by themselves.

Step 306: Using the proper noun detector 206, when case information is absent, proper nouns are detected (identified) by comparing each word in the remaining text against the dictionary 210. Typically, proper nouns start with uppercase letters. On other occasions, the text obtained is case insensitive. The dictionary 210 includes words that are not proper nouns. If the word under consideration is not present in the dictionary 210, then it is assumed to be a proper noun. Proper nouns convey useful contextual information as they refer to specific names of people, places or things. Words identified as proper nouns are therefore tagged by the proper noun detector 206 for ranking later.

Step 308: Using the proper noun detector 206, when case information is present, proper nouns are detected based on the case of the first character of each word. Proper nouns are tagged by the proper noun detector 206 for ranking later.

Step 310: The remaining words, and the number of their occurrences (frequency), is recorded by the indexer 208. More frequent words are important words, from which keywords will be selected. The record of words are reset as soon as the channel is changed or a topic change is discovered using special characters in the text obtained from the closed caption information.

Step 312: The indexer 208 maintains words identified within an n second window (i.e., words received within an n second period of time, which may be the last n seconds) and their frequencies and proper noun related information. For example, an n=10 second window includes the words gathered in the past 10 seconds. The keywords indexed in step 310 cover the entire current TV program/story, etc., being watched, while the keywords discussed in this step, cover those gathered in the last 'n' seconds.

Step 314: The frequency of all words is used by the keyword extractor 212 to extract words (i.e., keywords) of interest from all words gathered from the past n seconds.

Step 316: The keywords are used for forming queries in a query formation module 205 for performing searches on available resources such as search engines on the Internet 50 by a searching module 207. A User Interface (UI) module 203 presents the search results to the user as recommendations for optional further selection.

Step 318: The user selects among the recommendations, wherein the selected recommendation are used by the searching module 207 for searching the available resources for additional information of interest to the user. Such additional information is presented to the user by the UI module 203.

Steps 316 and 318 allow the user to find more information about a program that the user recently viewed on the TV, and can be repeated as the user desires to provide the user with additional and/or further refined information of interest to the user.

Figure 3B:
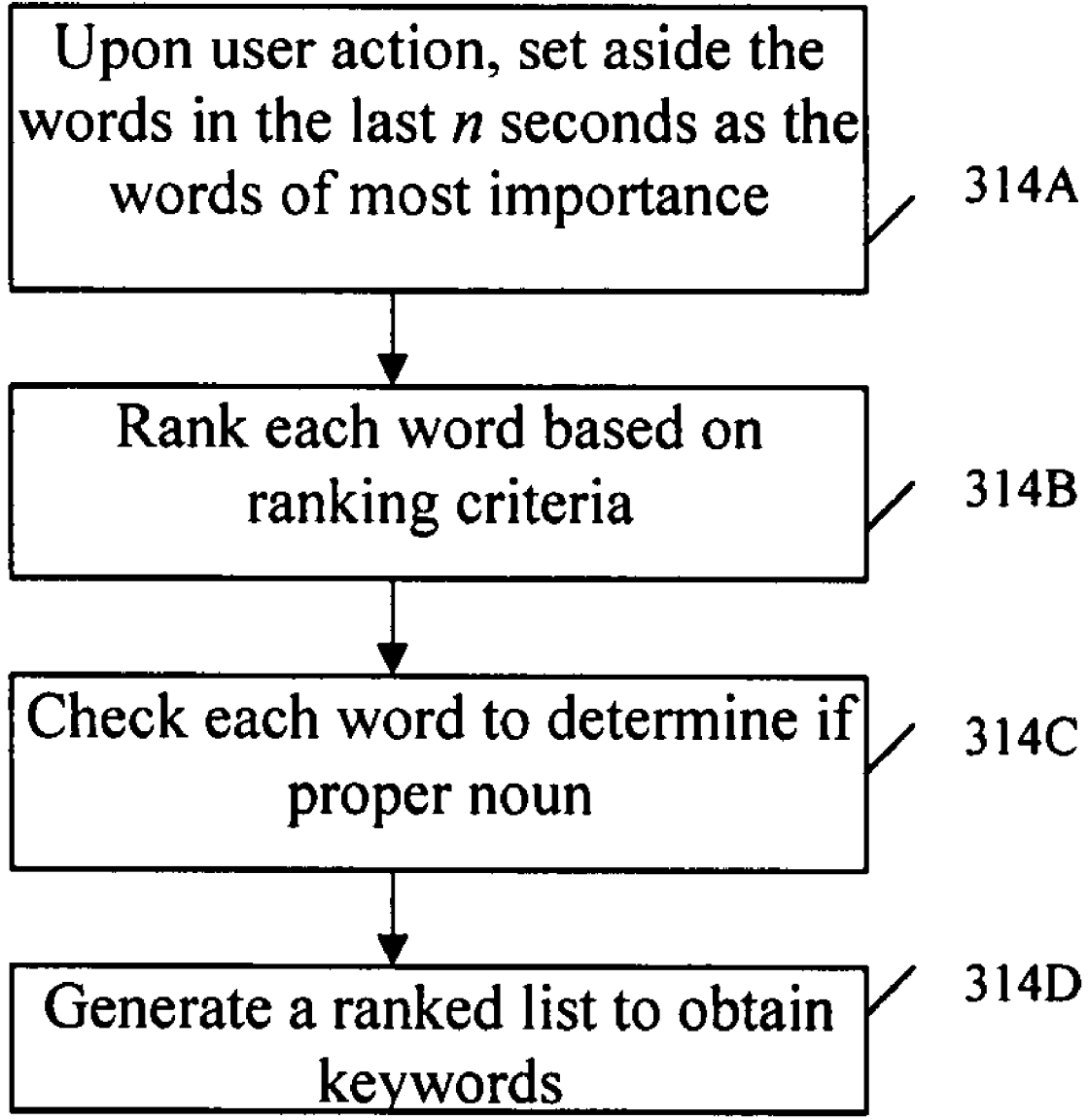
FIG. 3B shows a flowchart of example steps of keyword extraction in the process of FIG. 3A.

FIG. 3B shows an example flowchart of the steps performed by the keyword extractor 212, including:

Step 314A: When the user activates a specific button on the TV control (e.g., a TV remote control), this provides a "User Request" that includes the user action. Upon a User Request, the words in the last n seconds are set aside as the words of most importance by the keyword extractor 212.

Step 314B: Further, each word is ranked based on its frequency or another ranking mechanism.

Step 314C: Each word is also checked for proper noun status, using the tag generated in steps 308 or 310.

Step 314D: A ranked list is produced wherein, in one example, high frequency words that are also proper nouns occupy the top of the list. Then follow the high frequency words and then words that are proper nouns. The top i words from the ranked list along with the high frequency words and the proper nouns identified since the start of the TV program, capture the context of what the user is watching. The information from the ranked list is used as keywords. Words captured in the n second window represent the context at a finer level of detail, whereas the proper nouns and high frequency words captured since the start of the program represent the context at a higher level.

Using the EPG information, which includes information about TV programs on cable TV, satellite TV, etc., the name of the channel being viewed, is used to frame the queries in steps 316, 318, along with the channel and program information. For example, when the user is viewing the "Panorama" program on BBC America, the words "Panorama" and "BBC America" are appended to the extracted keywords to provide related information in the context of the channel and program for searching.

Further, the extracted keywords can be converted into different languages and used for searching to find additional information on the Internet 50. Further, converting keywords, as opposed to sentences, from one language to the other is simple and can be done using a language-to-language dictionary. This is beneficial to users who may understand only a minor portion of the language in the TV program being watched.

Figure 4:
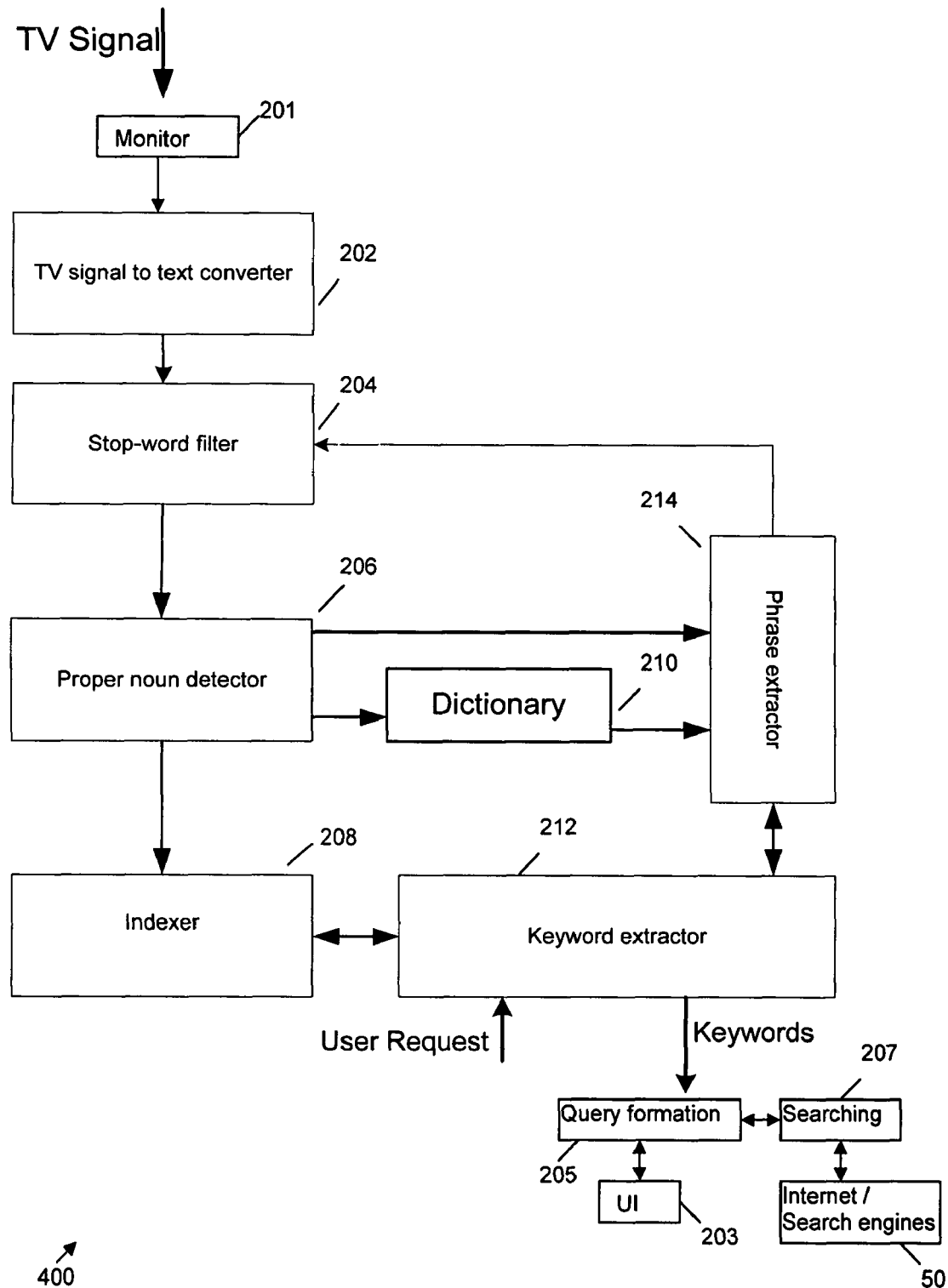
FIG. 4 shows a functional block diagram of another example system for analyzing TV closed caption information to find related information on the Internet, according to another embodiment of the present invention.

FIG. 4 shows a functional block diagram of another example of a system 400 for analyzing TV closed caption information to find related information on the Internet, according to the present invention. The system 400 is a variation of system 200 in FIG. 2, and further includes a phrase extractor 214 to identify phrases, in addition to keywords. An example of a phrase can be "Baltimore Ravens" instead of the keywords "Baltimore" and "Ravens."

In this embodiment, the keyword extractor 212 not only relies on information from the proper noun detector 206 and the indexer 208, but also uses information from the phrase extractor 214 to obtain keywords. The phrase extractor 214 includes a phrase identifier function that identifies important phrases using frequency and co-occurrence information recorded by the indexer 208, along with a set of rules. This is important in identifying multi-word phrases such as "United Nations", "Al Qaeda", etc.

In operation, the gathered closed caption text is first passed through the phrase identifier to capture phrases, and then the captured phrases are indexed. The phrase identifier internally maintains three lists: a list of proper nouns, a dictionary, and a list of stop-words. The phrase identifier uses an N-gram based approach to phrase extraction, in which conceptually, to capture a phrase of length 'N' words, a window of size 'N' words is slid across the text and all possible phrases (of length 'N' words) are collected. Then they are passed through the following set of three rules to filter out meaningless phrases:

1. A word ending with punctuation cannot be in the middle of a phrase.
2. For a phrase length of two words or more, the first word cannot be a stop word other than the two articles: "the" (definite) and "a/an" (indefinite) and the rest of the words cannot be stop words other than conjunctive stop words like "the", "on", "at", "of", in, "by", "for", "and", etc. This is because the above mentioned stop words are often used to combine two or more words: e.g., "war on terror", "wizard of oz", "the beauty and the beast", etc.
3. Proper nouns and words not present in the dictionary are treated as meaningful phrases.

In one example, in FIGS. 2 and/or 4 all the elements except the Internet/Search engine 50, reside on a CE device (e.g., CE device 30). In another example, in FIGS. 2 and/or 4 the Internet/Search engine 50 resides on the Internet, the dictionary 210 resides on the network (local or Internet), while the other elements reside on the CE device. Although, in the examples provided herein, a TV is used to receive closed caption information, the present invention can be applied to other devices (e.g., music player) that receive information that can be used for analysis to determine and search for information of interest to the user, according to the present invention. Further, although in FIG. 1 a CE device 30 which is used to receive programming in including closed caption information, is shown connected to a home network, such a home network is not required and the CE device can be a stand-alone device that receives programming from cable, satellite, DSL, or other sources of programming, without connection to a home network. Such a stand-alone device need only be connected to sources of information such as connected to the Internet 50, without the need for a home/local network. Further, the present invention can be implemented in non-CE devices (e.g., a device 20 in FIG. 1) that may be a stand-alone device or connected to a home/local network. Further, although in the examples herein closed caption information is used for analysis and determination of user interests, in another implementation the present invention is useful with other types of information that represent the type of programming or content being accessed/viewed by a user.

The phrase extractor 214 includes a term extractor function which extracts the highest score terms and phrases from the index. The terms and phrases are presented to the user and can be used for further searching to provide additional information of interest to the user. Alternatively, the phrase extractor 214 includes a natural language processing (NLP) tagger and a set of extraction rules to extract important phrases. In operation, the NLP tagger tags each word in the closed caption text with its part-of-speech (i.e. whether the word is a "noun", "adjective", "proper noun", etc.). The extraction rules define the kinds of sequences of such tags that are important. For example, a rule can be to extract phrases which are "a sequence of more than one 'proper nouns'" and another rule can be to extract "a sequence of one or more 'adjectives' followed by one or more 'nouns'." The phrase extractor applies these rules to the text tagged by the part-of-speech tagger and extracts phrases that follow these sequences. It can also be used to extract single word keywords by using appropriate rules. Further, the keyword extractor 212 and/or the phrase extractor 214 can use a set of rules for adaptive keyword/phrase extraction.

In the above examples, information from content metadata is extracted from metadata sources. The extracted information (e.g., meaningful keywords from closed captions of TV programs) are used as search queries for obtaining further information related to the content (e.g., TV programs), from sources such as the Internet.

Figure 5:
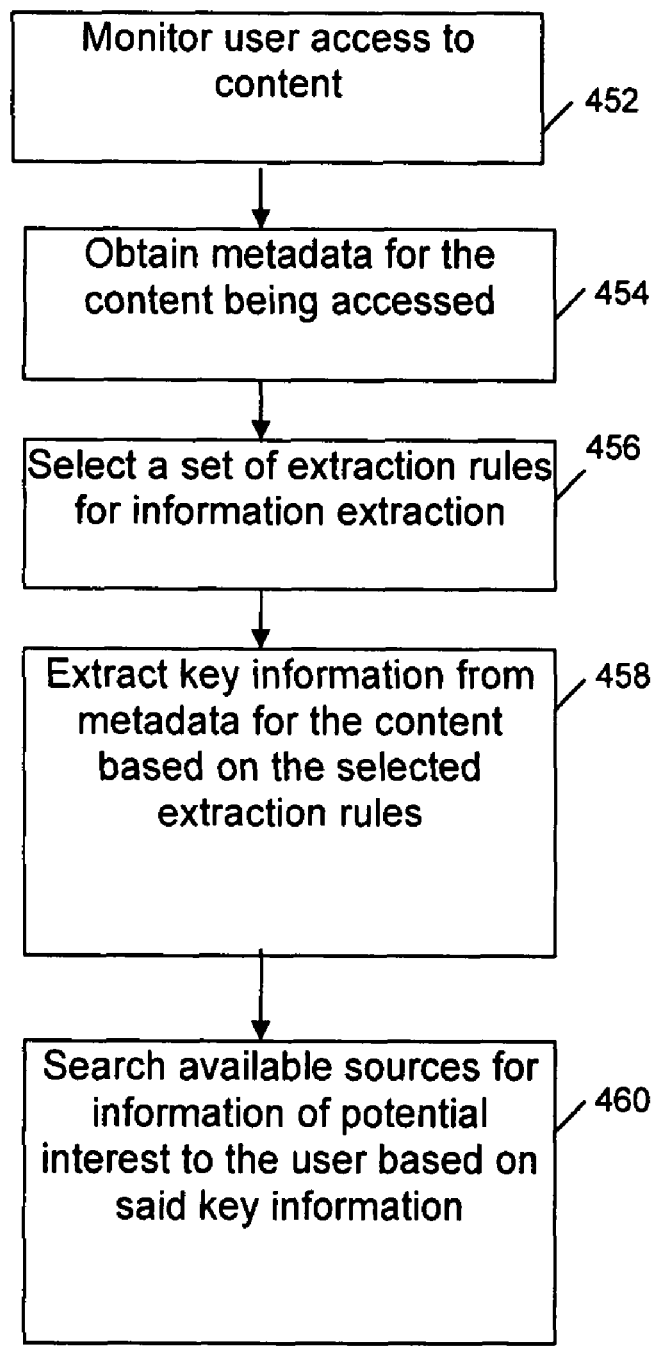
FIG. 5 shows a flowchart of example steps of another process for analyzing metadata information to find related information, according to an embodiment of the present invention.

In another embodiment, the present invention further provides a method and system for extracting key information (phrases/keywords) from content metadata, based on content type (genre or category). FIG. 5 shows a flowchart of example steps of another process 450 for analyzing metadata information to find related information, according to an embodiment of the present invention, including the steps of:

Step 452: Monitor user access to content.
Step 454: Obtain metadata for the content being accessed.
Step 456: Select a set of extraction rules for information extraction.
Step 458: Extract key information from metadata for the content based on the selected extraction rules.
Step 460: Search available sources for information of potential interest to the user based on said key information.

In one implementation, this involves altering key information extraction to adapt to different types of content accessed. For example, extracting keywords relevant to content such as TV programs from metadata sources such as closed captions, is adapted based on the genre of the content. Keyword extraction from closed captions text for TV programs is altered based on the EPG information for the TV programs.

The EPG indicates the genre of TV programs, wherein keyword extraction from closed captions is parameterized using the EPG genre information. Based on the EPG information, the genre (category) of a TV program is used to determine the kind of keywords to extract from the closed captions of the TV program. As such, the genre of a program currently being watched on a TV is obtained from the EPG information, and used to determine the kinds of keywords to extract from the closed captions of the program, which are considered useful in obtaining information of potential interest to the user (viewer).

In one example, if the TV program is a high content, factual program such as news, keywords are selected more aggressively, essentially extracting more keywords. On the other hand, if the TV program is a soap opera, then keywords are extracted very selectively, only extracting keywords that are believed to have a higher probability of being useful in obtaining information on potential interest to the user (viewer). As such keyword extraction rules are adapted (altered) depending upon the genre of the TV program.

Figure 6:
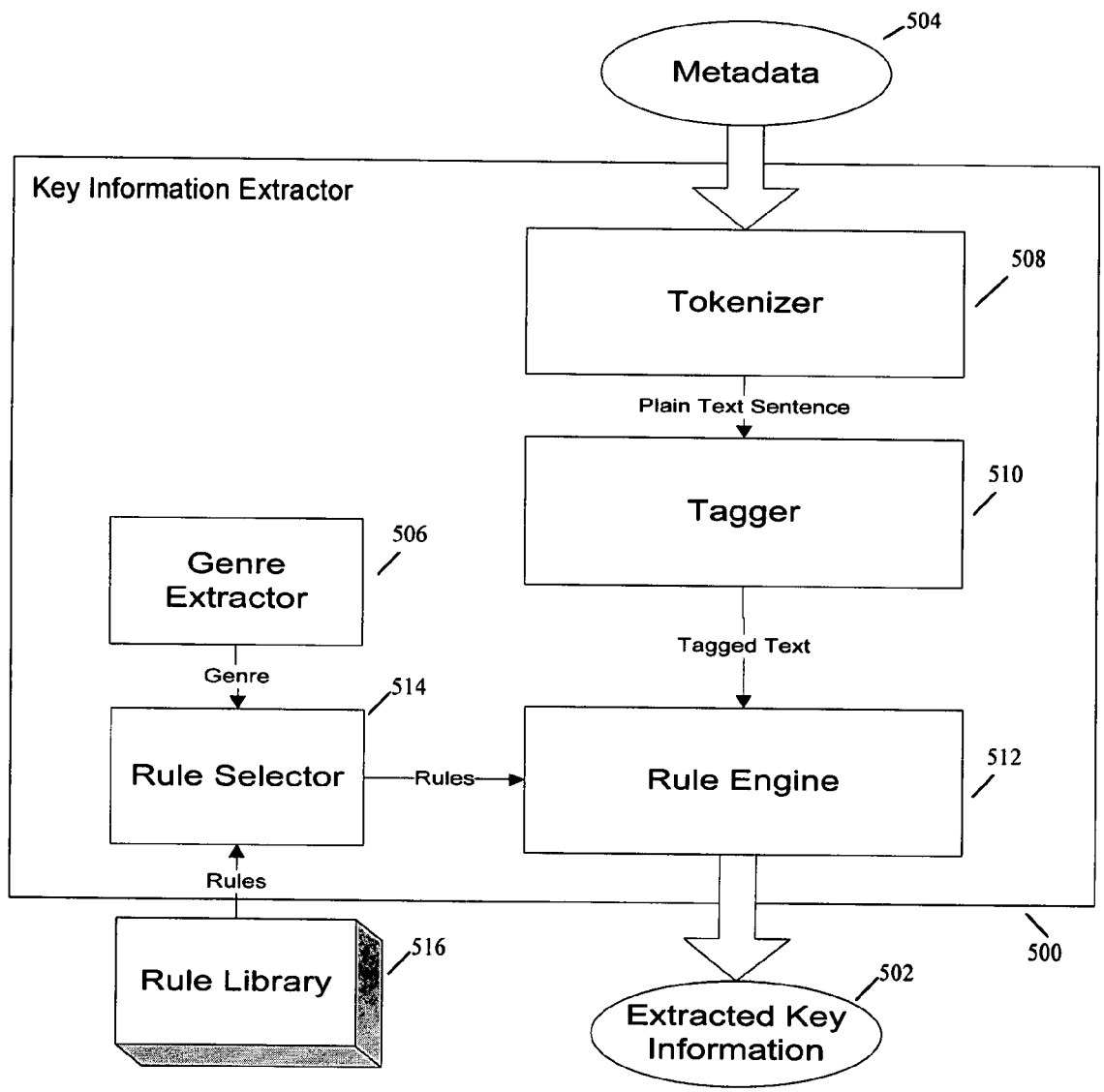
FIG. 6 shows a block diagram of a key information extractor that adapts to content genre for key information extraction, according to an embodiment of the present invention.

FIG. 6 shows a block diagram of a key information extractor 500 according to the present invention, for extracting key information (words/phrases) 502 from metadata information 504 for the content based on the genre 506 of the content being accessed. The extracted key information 502 is then used to form queries which can then be used to find relevant information of interest to the user from the Internet, as discussed above. The behavior of the extractor 500 in extracting key information adapts based on the genre of the content program being watched.

The key information extractor 500 includes a tokenizer 508, a tagger 510, a rule engine 512, a genre extractor 506 and a rule selector 514. The tokenizer 508 tokenizes the metadata 504 (e.g., text) for content being accessed into sentences. The tagger 510 then tags the sentences by determining the context of each word in the sentence (i.e., determines if a given word is a noun, verb, preposition, etc.). The tagged sentences (tagged text) are then passed on to the rule engine 512.

The genre extractor 506 extracts the genre of content being accessed, from a genre source. A rule library 516 stores a list of different rules. This is an exhaustive list of rules that can be used to extract all kinds of different key information. For example, the rule library 516 may include a rule to extract consecutive proper nouns, another rule to extract an adjective followed by a list of nouns, etc. The rules from the rule library 516, and the extracted genre from the genre extractor 506, are provided to the rule selector 514. The rule selector 514 contains a mapping from a genre to a set of rules from the library 516. This mapping can either be preset, or it can be learned.

Based on the extracted genre, the rule selector 514 selects a set of rules to be used by the rule engine 512 for extracting key information from the tagged sentences. The rule engine 512 receives a set of rules from the rule selector 514 and a sentence of tagged text from the tagger 510. The rule engine 512 applies the set rules to the tagged text and extracts key information from the tagged text. The key information is considered useful in obtaining information (e.g., from the Internet) that is related to the content being accessed, as described above. The obtained related information is of potential interest to the viewer (user) of the content being accessed.

If the process does not yield many keywords (e.g., due to a conservative extraction scheme), key information can be extracted from other sources of information about the content being accessed (such as the EPG for a TV program being watched).

Figure 7:
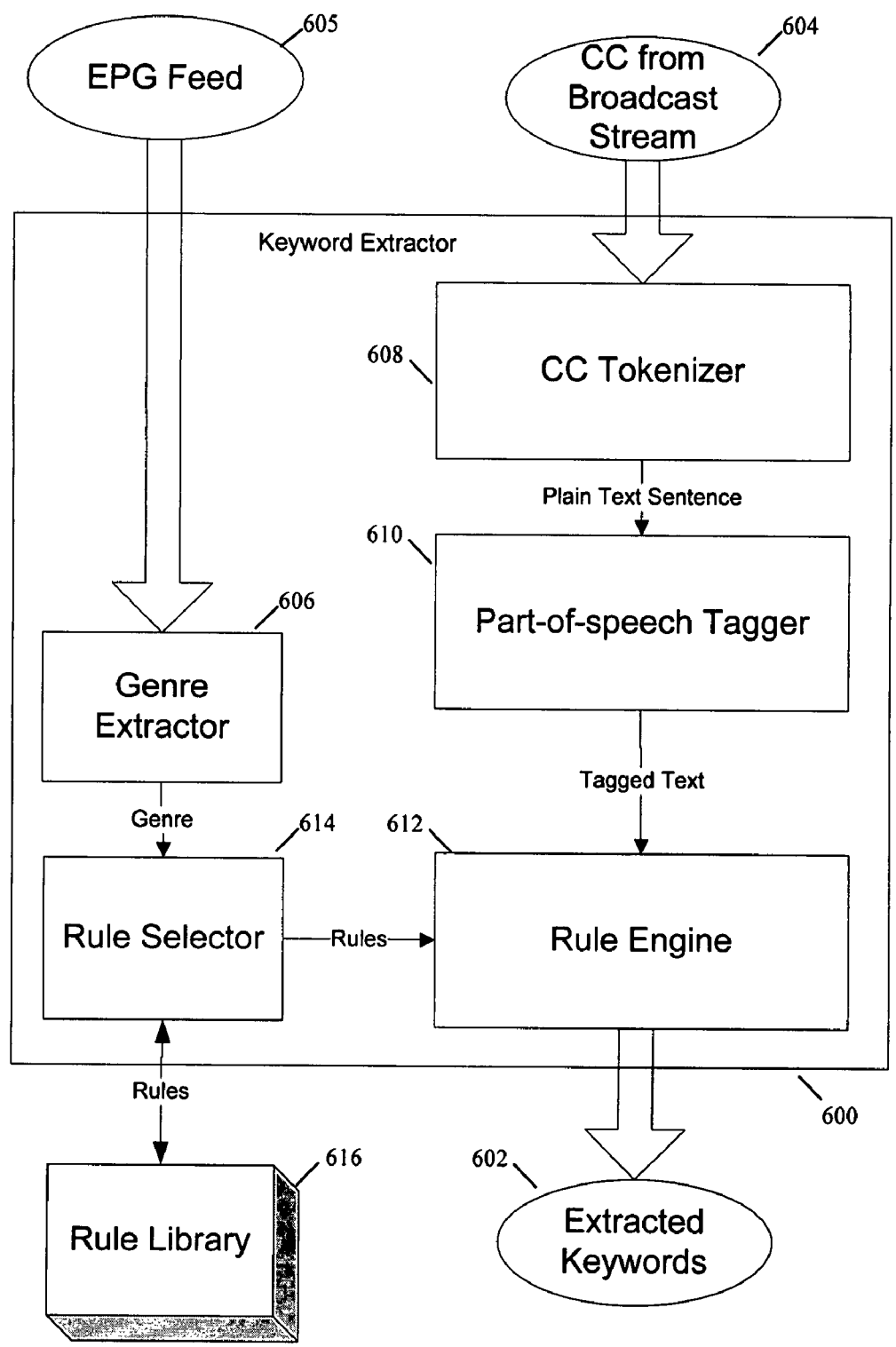
FIG. 7 shows a block diagram of an example keyword extractor that adapts to a TV program genre for keyword extraction, according to the present invention.

FIG. 7 shows an implementation of the key information extractor as a keyword extractor 600 for extracting keywords 602 from closed captions (CC) 604 of TV programs based on the genre 606 of the TV programs being watched. The extracted keywords 602 are then used to form queries which can then be used to find relevant information of interest to the user from the Internet, as discussed above. The behavior of the extractor 600 in extracting keywords adapts based on the genre of the TV programs being watched. The extracted keywords can be used as significant keywords of interest, and used in search queries, annotating the TV programs, etc.

The keyword extractor 600 includes a CC tokenizer 608, a part-of-speech tagger 610, a rule engine 612, a genre extractor 606 and a rule selector 614. The tokenizer 608 tokenizes the CC text 604 of the TV program into sentences. The part-of-speech tagger 610 then tags the sentences by determining the context of each word in the sentence (i.e., determines if a given word is a noun, verb, preposition, etc.). The tagged sentences (tagged text) are then passed on to the rule engine 612. The genre extractor 606 extracts the genre of content being accessed from the EPG information feed 605. A rule library 616 stores a list of different rules that can be used to extract all kinds of different keywords. The rules from the rule library 616 and the extracted genre from the genre extractor 606 are provided to the rule selector 614. The rule selector 614 contains a mapping from genre to a set of rules from the library 616. This mapping can either be preset, or it can be learned.

Based on the extracted genre, the rule selector 614 selects a set of rules to be used by the rule engine 612 for extracting keywords from the tagged sentences. The rule engine 612 receives a set of rules from the rule selector 614, and a sentence of tagged text from the tagger 610. The rule engine 612 applies the set rules to the tagged text and extracts keywords from the tagged text. The keywords are considered useful in obtaining information (e.g., from the Internet) that is related to the TV program being accessed, as described above. The obtained related information is of potential interest to the viewer of the TV program being accessed.

In one example operation, the keyword extractor 600 functions in real-time on real TV signals, wherein there is a steady stream of incoming closed caption text for a TV program. The CC tokenizer 608 breaks down the closed caption text into sentences in order to preserve the grammar of the sentences in the closed caption text, which is important for tagging the sentences. The closed caption characters are buffered in a memory buffer, and the currently received text received is analyzed to detect the end of a sentence (e.g., by monitoring punctuations, spaces, etc.). A token refers to a sentence, wherein the tokenizer 608 breaks the closed caption text into sentences by detecting punctuations and using heuristics. A simple heuristic can be used such as treating the occurrence of a period (.), a question mark (?) or an exclamation point (!) followed by a space as the sentence boundary (e.g., end of a sentence). Other models can also be used, as those skilled in the art will recognize. When the CC tokenizer 608 detects the end of the sentence, it clears the buffer and provides the received sentence to the part-of speech tagger 610 as a plain-text sentence.

The part-of speech tagger 610 analyzes the plain-text sentence and assigns tags to each word in the sentence, generating tagged text. Tags refer to part-of-speech tags, wherein each word in a sentence is assigned a tag which describes the sense in which the word is used in that sentence (i.e., the part-of-speech of the word.) Some example tags are:

/NNP i.e., Proper Noun
/MOD i.e., Modal Auxiliary Verbs
/NNS i.e., Plural Noun, etc.

A rule-based part-of-speech tagger can be used, such as a Brill's tagger. (Brill, E. 1992. A simple rule-based part of speech tagger. In Proceedings of the Third Conference on Applied Natural Language Processing, 152-155. Trento, Italy.) Other taggers can also be used which mark each word in a sentence with its part-of-speech. For example if the plain-text sentence input to the tagger 610 is "John Wayne ran home", then the tagged text output from the tagger 610 is "John<proper noun> Wayne<proper noun> ran<verb-past tense> home<noun>". This indicates that in the tagged text the words "John" and "Wayne" are tagged as proper nouns, the word "ran" is tagged as a verb in past tense, and the word "home" is tagged a noun. This tagged text is then passed on to the rule engine 612.

Suppose the sentence "John Wayne ran home" occurs in a 'Documentary' program. The part-of-speech tagger 610, tags it as: "John/NNP Wayne/NNP ran/VBD home/NN"

Where:
/NNP→proper noun
/VBD→verb (past tense)
/NN→noun

Now suppose the example rule library is as given above, wherein:
consecutive_proper_noun: ((\w+)(/NNP))+
consecutive_singular_nouns: ((\w+)(/NN))+
noun_conjunction_noun: ((\w+)(/NN))+((\w+)(/CC))+ ((\w+) (/NN))+
adjective_consecutive_nouns: ((\w+)(/ADJ))+((\w+) (/NN))+

Such that according to the rule selector 614, the mapping for 'Documentary' genre is:
Documentary→consecutive_proper_noun Then, when the rule 'consecutive_proper_noun' is applied to the tagged sentence, the rule engine 612 extracts the keyword: 'John Wayne'.

As noted, the rule library 616 maintains a list of rules that can be used to extract different types of keywords. Rules can either be added to the library 616 manually, be pre-learned or learned over time. Each rule is a regular expression that the rule engine 612 understands. For example, the rule to extract phrases containing consecutive occurrences of proper nouns can be:

$$((\backslash w+)(/NNP))+ \qquad (1)$$

where "+" means one or more occurrences and "\w" means an alphabet.

As such, given the tagged text:

$$\text{Pablo/NNP Picasso/NNP and/CC Vincent/NNP Van/} \\ \text{NNP Gogh/NNP were/VBD artists/NNS} \qquad (2)$$

the rule engine 612 applying rule (1) above would extract two keywords "Pablo Picasso" and "Vincent Van Gogh" from the example tagged text (2) above. An example rule library can be as follows:
consecutive_proper_noun: ((\w+)(/NNP))+ consecutive_singular_nouns: ((\w+)(/NN))+
noun_conjunction_noun: ((\w+)(/NN))+((\w+)(/CC))+ ((\w+)(/NN))+
adjective_consecutive_nouns: ((\w+)(/ADJ))+((\w+)(/NN))+

The mapping in the rule selector 614 includes genre mapping for mapping the genre of a TV program to a subset of the list of rules in the rule library 616. For example, the genre mapping from program genres "News" and "Sitcom" can be as follows:

News→consecutive_proper_noun, noun_conjunction_noun, adjective_consecutive_nouns Sitcom→consecutive_proper_noun The genre mapping can be created by conducting a user study and analyzing its results as in the following example steps (a)-(e):

a. Ask M users to read the transcripts of N number of TV programs of a given genre G and mark all the keywords that they think are good (significant) keywords, K. The higher the value of M and N, the better it is. For example, consider the sentence: "Pablo Picasso and Vincent Van Gogh were artists." And, suppose a user selects "Pablo Picasso", "Vincent Van Gogh" and "artists" as interesting keywords.

b. Pass the transcript through the part-of-speech tagger 610 and tag it; e.g., The tags for the above sentence would be: Pablo/NNP Picasso/NNP and/CC Vincent/NNP Van/NNP Gogh/NNP were/VBD artists/NNS.

c. For each keyword in set K, extract the tags assigned to individual words; e.g., The tags for the marked words would be:
Pablo Picasso: /NNP /NNP
Vincent Van Gogh: /NNP /NNP /NNP
Artists: /NNS d. Convert each tag sequence extracted in the previous step into a pattern that the rule engine 612 can understand; e.g. The above three sequences would become:
Pablo Picasso: ((\w+)(/NNP))+
Vincent Van Gogh: ((\w+)(/NNP))+
Artists: (\w+)(/NNS)

e. Select the unique patterns from the sequences and rank them according to frequency; e.g.,
((\w+)(/NNP))+–frequency=2
(\w+)(/NNS)–frequency=1 f. The resultant patterns are the candidate set of rules for genre G. To reduce the size of the rule set, the top ranked "P" rules or all rules with frequencies more than "F" can be selected as the final rule set for genre G.

The above process for creating a mapping can be learned over time as well. In step (a) whenever the user is using the extractor 600 and is presented with some keywords, if the user clicks one of them (indicating that the user finds the keyword useful), it is treated as a keyword marked by a user. The rest of the process is same as the steps (b)-(f), above. If the final rule set already contains this newly created rule, it is discarded. The mapping in the rule selector 614 can include other mappings in addition to the genre mapping. Such other mappings can be default mappings that are not based on genre, as described further below.

The rule engine 612 comprises a conventional pattern matching program, taking in text input and one or more patterns (rules), and extracting all keywords that match one or more of the patterns.

If the process does not yield many keywords (e.g., due to a conservative extraction scheme), key information can be extracted from other sources of information about the content being accessed (such an EPG for a TV program being watched). A determination that insufficient keywords were obtained can be based on a fixed constraint across all genres (e.g., less than X keywords is insufficient), a genre-based fixed constraint (e.g., for a Sitcom, less than X keywords is insufficient; but for News, less than Y is not enough), etc. Extracting keywords from the EPG for a program can be as follows: an EPG entry contains some structured entries (e.g., title, actor) and some semi-structured entries (e.g., description); keywords are extracted from the semi-structured entries in the EPG in the same way as from closed captions; whereas the information in the structured entries could be used "as is", without any processing.

In one example, the elements of the extractors 500 and 600 can be implemented on TV hardware that includes memory and a microprocessor or as firmware, etc., and thus the communication between elements within each of the extractors 500 and 600 is through function calls. The rule library can be in the form of a database on the TV, which is queried by the rule selector; or it can be on a server in the network wherein the communication with the rule selector would be through HTTP or SOAP or other similar protocols.

Figure 8:
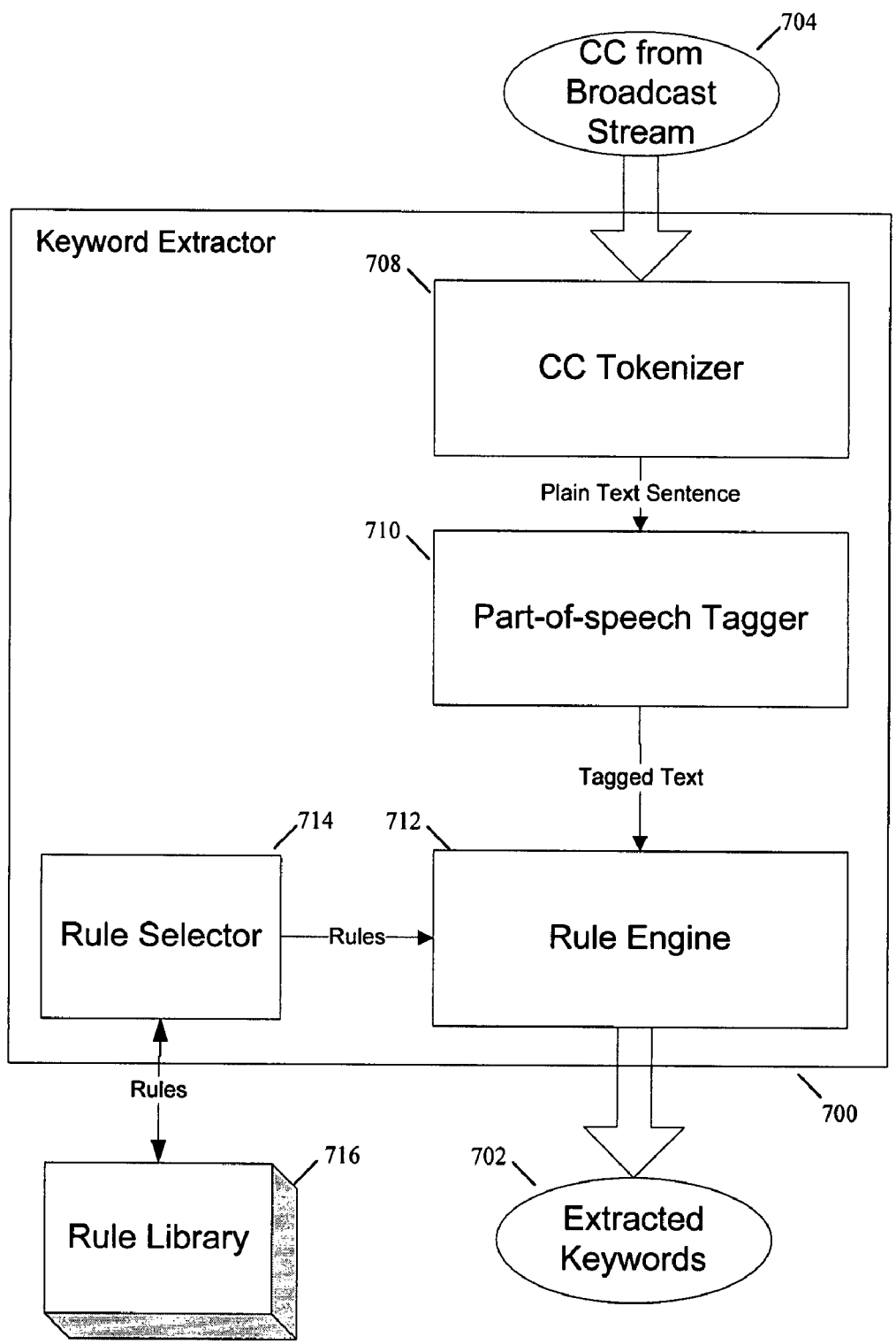
FIG. 8 shows a block diagram of an example keyword extractor that does not utilize program genre for keyword extraction, according to the present invention.

FIG. 8 shows another example keyword extractor 700 wherein keywords are extracted from content metadata without requiring the type (genre) of the content for extracting keywords 702 from closed captions (CC) 704 of TV programs. The keyword extractor 700 includes a CC tokenizer 708, a part-of-speech tagger 710, a rule engine 712 and a rule selector 714. The CC tokenizer 708, the part-of-speech tagger 710 and the rule engine 712 are similar to the CC tokenizer 608, the part-of-speech tagger 610 and the rule engine 612 in FIG. 7, respectively. Further, similar to the library 616 in FIG. 7, a rule library 716 in FIG. 8 stores a list of different rules that can be used to extract all kinds of different keywords.

The rules from the rule library 716 are provided to the rule selector 714. The rule selector 714 contains a "default" mapping to a set of rules from the library 716, wherein the "default" mapping is used to select rules from the library 716 for the rule engine 712 (e.g., the rule selector 714 uses default mapping rules A, B and C, etc., which do not use a genre for selecting rules). The rule engine 712 receives a set of rules from the rule selector 714, and a sentence of tagged text from the tagger 710. The rule engine 712 applies the set rules to the tagged text and extracts keywords from the tagged text.

In one example, if there is no genre associated with a program, then the system uses a "default" mapping. In that case, very conservative keyword extraction rules should be used to ensure only keywords with a high probability of being important are extracted. For example, the rule selector might have a default mapping entry:

Default→consecutive_proper_noun.

Figure 9:
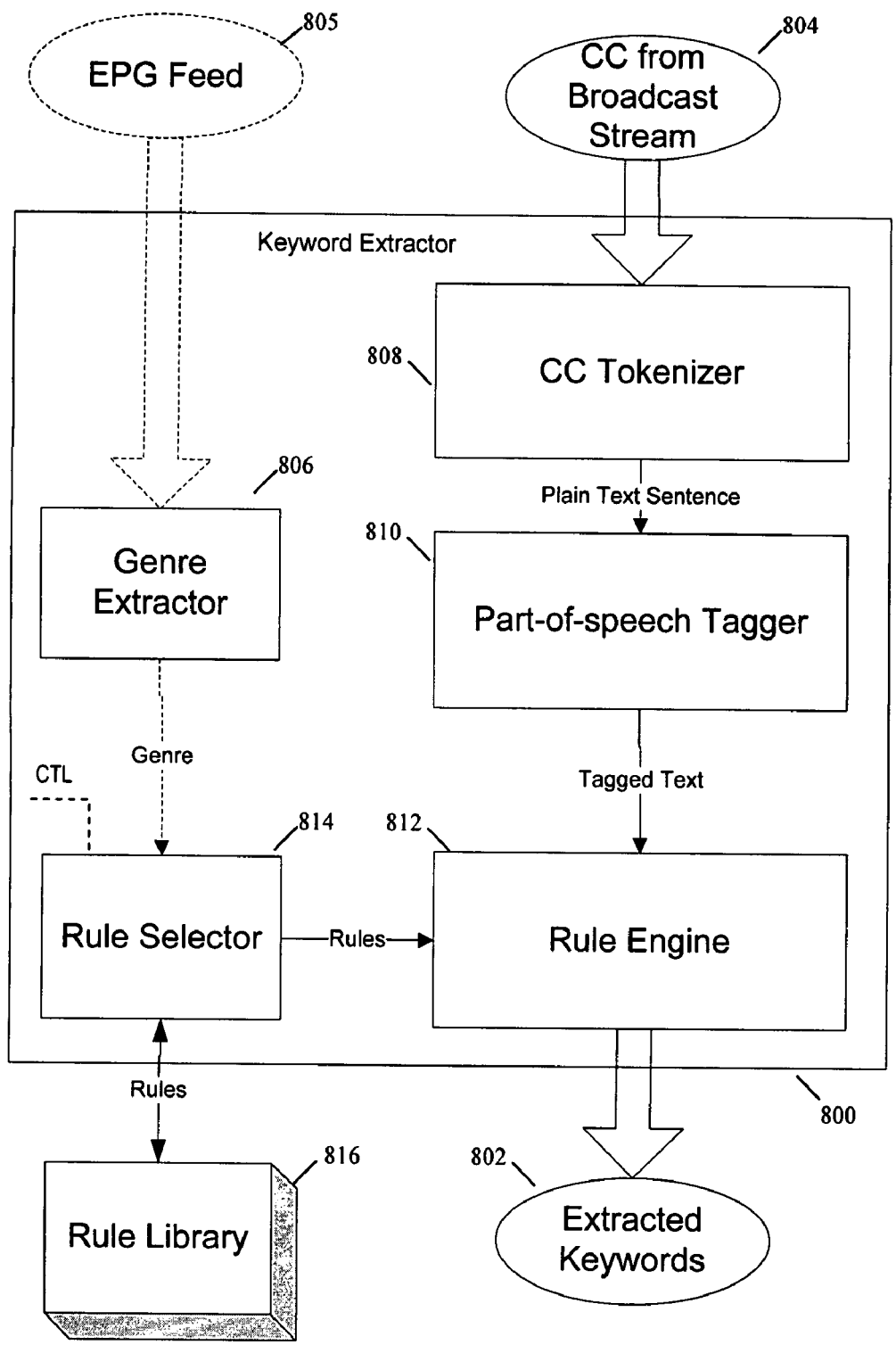
FIG. 9 shows a block diagram of an example keyword extractor with the capability to adapt to a TV program genre for keyword extraction or to perform keyword extraction without using a program genre, according to the present invention.

FIG. 9 shows another example keyword extractor 800 wherein use of a TV program's genre for extracting keywords 802 from closed captions (CC) 804 of TV programs is optional. The keyword extractor 800 includes a CC tokenizer 808, a part-of-speech tagger 810, a rule engine 812 and a rule selector 814. The keyword extractor further includes a genre extractor 806 similar to the genre extractor in FIG. 7. The CC tokenizer 808, the part-of-speech tagger 810 and the rule engine 812 are similar to the CC tokenizer 708, the part-of-speech tagger 710 and the rule engine 712 in FIG. 8, respectively. Further, similar to the library 716 in FIG. 8, a rule library 816 in FIG. 9 stores a list of different rules that can be used to extract all kinds of different keywords. The rules from the rule library 816 are provided to the rule selector 814.

The rule selector 814 contains a genre mapping from a genre to a set of rules from the library 816. This genre mapping can either be preset, or it can be learned. Based on the genre extracted by the genre extractor 806, the rule selector 814 uses the genre mapping to select a set of rules from the library 816 to be used by the rule engine 812 for extracting keywords from the tagged sentences. The rule selector 814 also contains a "default" mapping to a set of rules from the library 816 (e.g., if no genre is known or used, then use the default mapping rules A, B and C). The "default" mapping in the rule selector 814 is similar to that described for the rule selector 714 above.

As such, if the genre of a TV program is not known, or is not used, the rule selector 814 uses the "default" mapping for selecting rules from the rules library 816, without relying on the genre of the TV program. If the genre of the TV program is known, then the rule selector 814 uses the genre mapping to select rules from the rules library 816 based on the genre provided by the genre extractor 806. In one example of the rule selector 814, even if the genre extractor 806 provides a genre for a TV program, the rule selector does not rely on the genre and uses the "default" mapping for rule selection. Optionally, the rule selector 814 can receive a selection signal (CTL) that instructs the rule selector to use the genre mapping or the "default" mapping for rule selection.

The rule engine 712 receives a set of rules from the rule selector 714, and a sentence of tagged text from the tagger 710. The rule engine 712 applies the set rules to the tagged text and extracts keywords from the tagged text.

Figure 10:
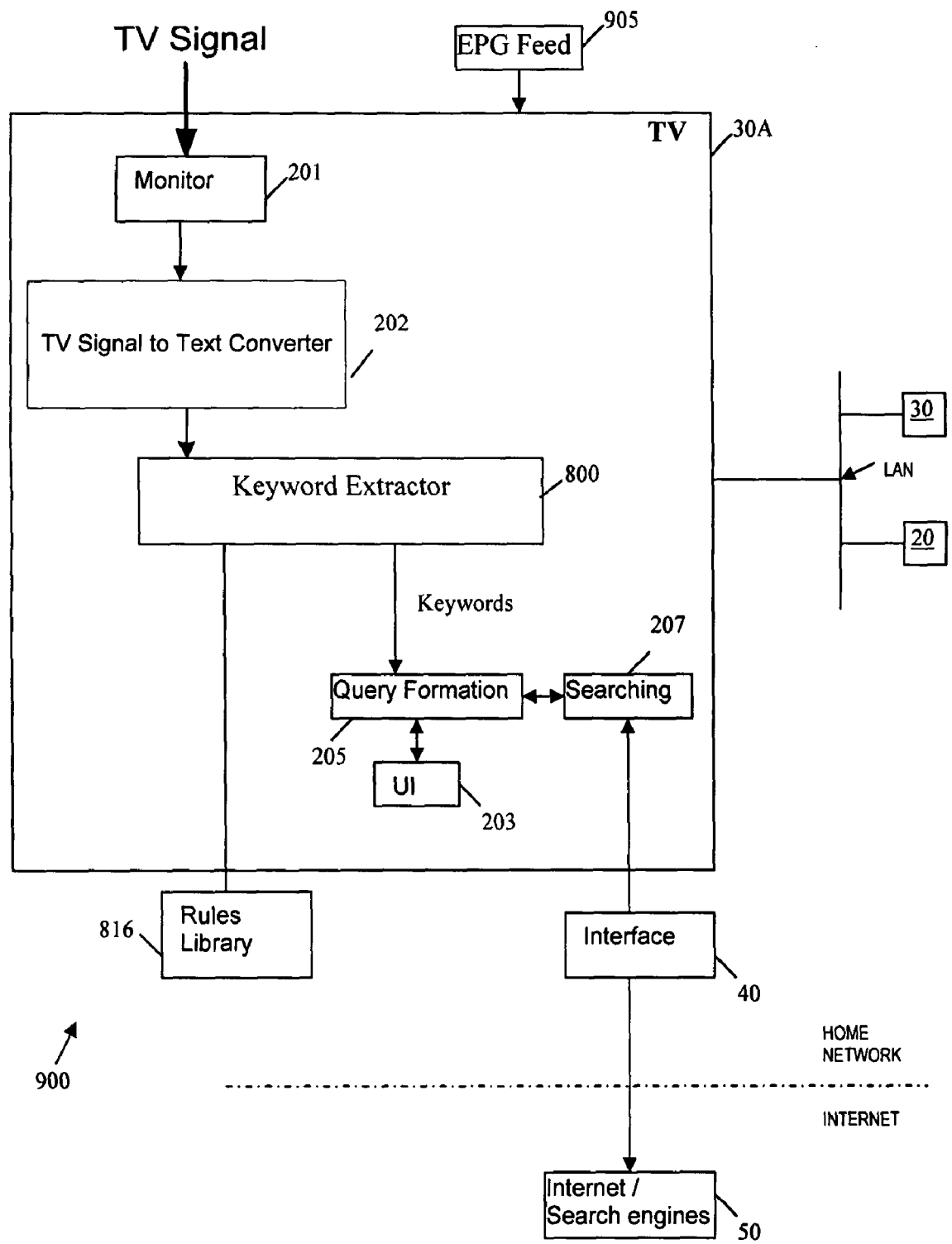
FIG. 10 shows a functional block diagram of a system for analyzing TV closed caption information for keyword extraction to find related information on the Internet, using a keyword extractor according to FIG. 9, according to an embodiment of the present invention.

Either of the extractors 600, 700 or 800 above can be used as an implementation of the extractor 212 and/or the extractor 214 in FIGS. 2 and 4. FIG. 10 shows an example system 900 based on the system 400 in FIG. 4, which utilizes the keyword extractor 800. As discussed, the keyword extractor 800 does not require use of program genre in keyword extraction. However, the keyword extractor 800 includes the ability to adapt keyword extraction based on program genre (extracted from the EPG feed 905). In this example, the modules 202, 203, 205, 207 and 800 are implemented in a CE device such as digital TV 30A. The TV 30A is shown connected to a LAN.

Although the above examples are provided in the context of a home network, those skilled in the art will recognize that the present invention is useful for stand-alone devices that are not necessarily part of a home network such as a LAN. For example, in FIG. 10, the TV 30A need not be connected to the LAN.

As is known to those skilled in the art, the aforementioned example architectures described above, according to the present invention, can be implemented in many ways, such as program instructions for execution by a processor, as logic circuits, as an application specific integrated circuit, as firmware, etc. The present invention has been described in considerable detail with reference to certain preferred versions thereof; however, other versions are possible. Therefore, the spirit and scope of the appended claims should not be limited to the description of the preferred versions contained herein.

What is claimed is:

1. A method of extracting information from content metadata, comprising the steps of:
    while content is being displayed on a device, periodically updating a first word buffer with words extracted from closed captioning information corresponding to content since a beginning of a program or story;
    monitoring user interaction with the device to identify when a user provides user input indicating an interest in learning more information about content currently being displayed on the electronic device;
    determining a genre of the content;
    selecting a set of extraction rules for information extraction, based on the genre of the content, wherein the set of extraction rules differs from another set of extraction rules corresponding to a different genre;
    extracting key information from the first word buffer based on the selected extraction rules;
    constructing a query for information of potential interest to the user based on the key information; and
    issuing the query to one or more data sources, returning results.

2. The method of claim 1 further including, while content is being displayed on the device, periodically updating a second word buffer with words extracted from closed captioning information corresponding to content based on a most recent n seconds, wherein n is a preset value, such that the second word buffer maintains keywords only present in the closed captioning information during the last n seconds of time.

3. The method of claim 2, wherein the extracting of key information includes extracting words from the second word buffer based on a frequency of words appearing in the first word buffer.

4. The method of claim 1, wherein the determining a genre of the content includes examining an Electronic Program Guide (EPG) object for a currently playing program.

5. The method of claim 1, wherein the set of extraction rules involves more aggressively selecting keywords if the genre is related to a high-content, factual program than with other genres.

6. The method of claim 3 wherein selecting a set of extraction rules further includes the step of selecting a set of extraction rules from a rules library based on the genre of the content, wherein the rules library includes a list of rules for extracting various keywords.

7. The method of claim 4 wherein extracting key information further includes the step of tokenizing closed captioned text for the TV program into one or more sentences.

8. The method of claim 7 wherein extracting key information further includes:
    tagging each word of a sentence based on the content of each word in the sentence.

9. The method of claim 8 wherein extracting key information further includes extracting keywords from each tagged sentence based on the extraction rules.

10. The method of claim 3 wherein selecting a set of extraction rules based on the genre further includes selecting extraction rules by mapping from content to a set of rules from a number of rules in a rules library that includes rules for extracting various keywords.

11. The method of claim 1 further including the step of searching available sources for information of potential interest to the user based on the query.

12. The method of claim 11 further comprising the step of providing information of potential interest to the user.

13. The method of claim 1 wherein the content is accessed via a consumer electronics (CE) device, such that the step of monitoring further includes the step of monitoring user interaction with the device.

14. The method of claim 13 wherein the step of determining key information includes extracting key information from metadata for the content accessed via the device, based on the selected extraction rules.

15. The method of claim 14 wherein the step of monitoring further includes monitoring which content the user chooses to access via the device.

16. The method of claim 15 wherein the step of monitoring further includes monitoring the closed caption information provided via a channel that the user chooses to access via the device.

17. The method of claim 11 further comprising the steps of:
providing the search results to the user as information of potential interest to the user;
receiving a user selection form the information of potential interest to the user; and
performing further searching of available sources for additional information of potential interest to the user based on the user selected information.

18. The method of claim 13 wherein:
the content is accessed via a CE device, and the device can be connected to a local area network; and
searching available sources further includes forming a query based on the key information and searching the Internet using the query.

19. An electronic device comprising:
an indexer configured to, while content is being displayed on the electronic device, periodically update a first word buffer with words extracted from closed captioning information corresponding to content since a beginning of a program or story;
a monitor configured for monitoring user interaction with the electronic device to identify when a user provides user input indicating an interest in learning more information about content currently being displayed on the electronic device;
a genre extractor configured to determine a genre of the content;
a rule selector configured for selecting a set of extraction rules for information extraction, based on the genre of the content, wherein the set of extraction rules differs from another set of extraction rules corresponding to a different genre; and
an information extractor configured for extracting key information from the first word buffer based on the selected extraction rules.

20. The device of claim 19 wherein the rule selector is further configured for selecting a set of extraction rules based on the content type.

21. The device of claim 20 wherein the content comprises a TV program and the metadata for the TV program comprises closed captioned information associated with the TV program.

22. The device of claim 21 wherein the genre extractor is further configured for determining a genre for the content by extracting a genre for the TV program from an electronic program guide (EPG) object.

23. The device of claim 20 wherein the rule selector is further configured for selecting a set of extraction rules from a rules library based on the content type, wherein the rules library includes a list of rules for extracting various keywords.

24. The device of claim 21 wherein the information extractor includes a tokenizer configured for tokenizing closed captioned text for the TV program into on or more sentences.

25. The device of claim 24 wherein the information extractor further includes a tagger configured for tagging each word of a sentence based on the context of each word in the sentence.

26. The device of claim 25 wherein the information extractor further includes a rule engine configured for extracting keywords from each tagged sentence based on the extraction rules.

27. The device of claim 20 wherein the rule extractor is further configured for selecting extraction rules by mapping from content to a set of rules from a number of rules in a rules library that includes rules for extracting various keywords.

28. The device of claim 19 further comprising a search module configured for searching available sources for information of potential interest to the user based on said key information.

29. The device of claim 28 further comprising a user interface configured for providing information of potential interest to the user.

30. The device of claim 28 wherein the search module is further configured for forming a query based on the key information, and searching an external network using the query.

31. The device of claim 19 wherein the monitor is further configured for monitoring closed caption information provided via a channel that the user chooses to access via the device.

32. The device of claim 28 further comprising a user interface configured for
providing the search results to the user as information of potential interest to the user, and receiving a user selection from the information of potential interest to the user;
wherein the searching module is further configured for performing further searching of available sources for additional information of potential interest to the user based on the user selected information.

33. The device of claim 31 wherein the device comprises a consumer electronics (CE) device.

34. The device of claim 33 wherein the CE device is configured for connection to a local area network.

35. The device of claim 31 wherein the device comprises a TV.

* * * * *